Oct. 16, 1945.  J. F. FURRY  2,386,889
COIL ASSEMBLIES
Filed Aug. 2, 1940  2 Sheets-Sheet 1

INVENTOR
JOHN F. FURRY
BY
Wheeler, Wheeler + Wheeler
ATTORNEYS.

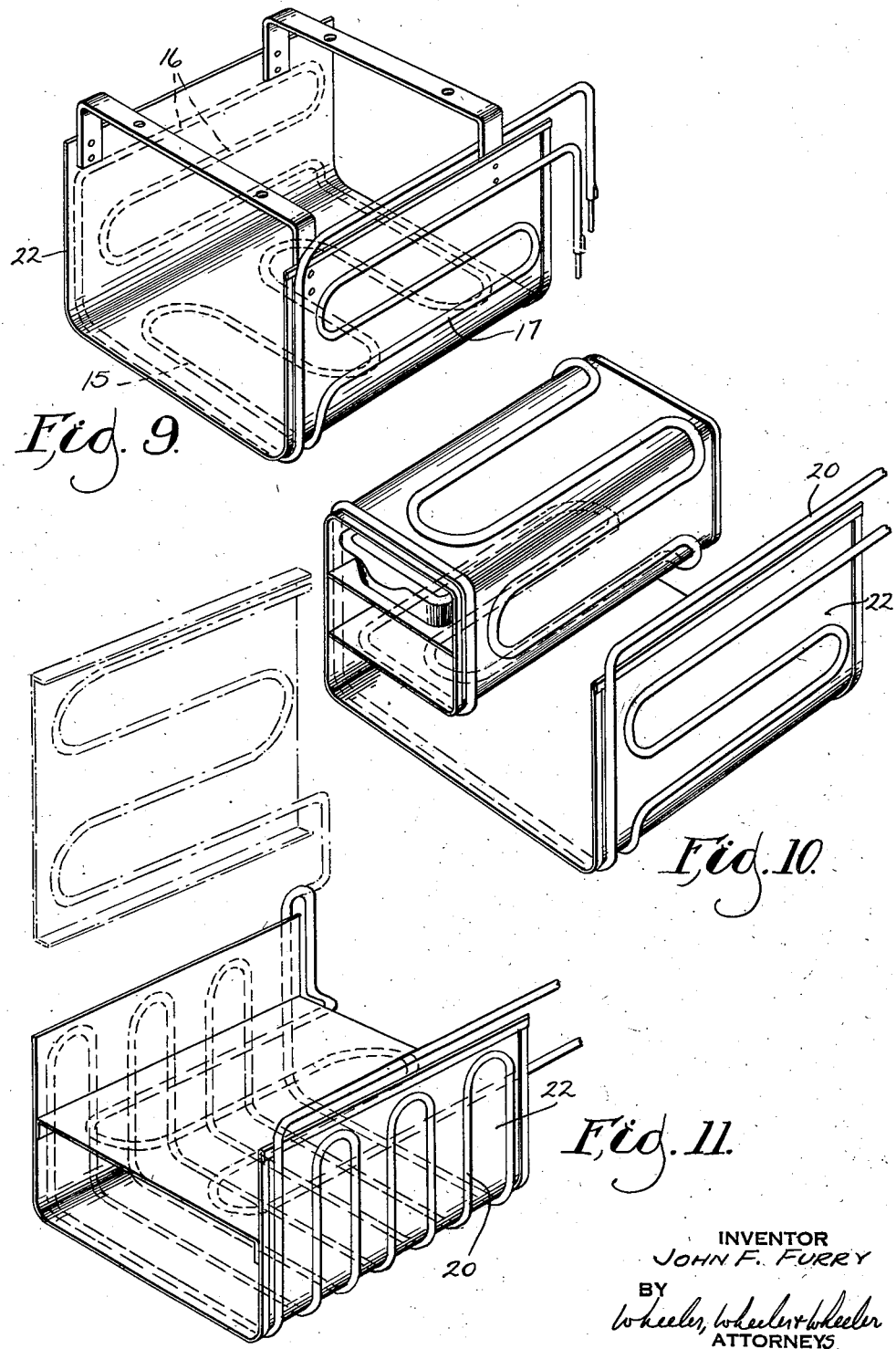

Patented Oct. 16, 1945

2,386,889

UNITED STATES PATENT OFFICE 2,386,889

COIL ASSEMBLY

John F. Furry, Galesburg, Ill., assignor to Outboard, Marine & Manufacturing Company, Galesburg, Ill., a corporation of Delaware Application August 2, 1940, Serial No. 349,603

2 Claims. (Cl. 62—126)

This invention relates to improvements in coil assemblies and methods for the manufacture thereof, such improvements being particularly adaptable to the manufacture of refrigerator evaporators, condensers and the like.

The primary object of the invention is to provide a method whereby a preformed convoluted tube may be effectively and economically integrally joined to one surface of a metallic sheet whereby to provide sheet and tube composite stock out of which evaporators or condensers can be quickly and economically assembled.

A further object of the invention is to provide an improved method of welding at one time a large number of such sheet and tube stock units. A still further object is to provide an improved method for assembling coil structures of various shapes.

A further object is to provide a method for effecting great economy in the assembly of a refrigeration evaporator of the refrigerated shelf type.

Another important object of the invention is the production of a novel and improved flat evaporator mid-product adapted to be stored or shipped flat prior to final formation. The invention further seeks to provide a novel and thermally effective evaporator structure adapted to take full advantage of the manufacturing economies herein disclosed.

Other objects and advantages of the invention will become apparent to those skilled in the art upon an examination of the following disclosures.

In the drawings:

Fig. 9 is a view in perspective of a finished evaporator assembled from stock prepared by my improved method.

Fig. 10 is a perspective view showing an alternative evaporator construction employing the improved stock.

Fig. 11 is a view in perspective disclosing an evaporator of the refrigerated shelf type which has been assembled from my improved stock.

Like parts are identified by the same reference characters throughout the several views.

My invention contemplates the forming of sheet and tube stock to make an evaporator which consists of a flat sheet having a convoluted tubular conduit metallically joined to one side thereof. The flat stock is subsequently bent into desired shapes to produce various types of evaporators whereby to effect substantial economies in the manufacture thereof.

Figure 1:
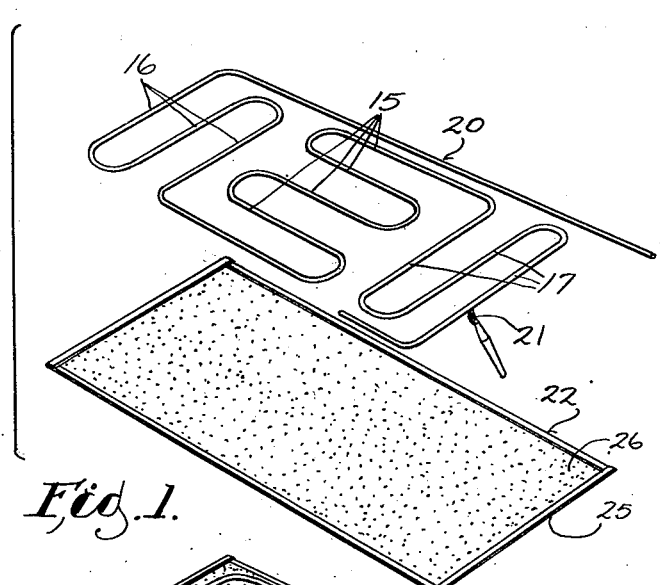
Fig. 1 is a view in perspective showing the fluxing of a pre-shaped tubular conduit preparatory to the welding of said conduit to the upper face of a companion sheet.

As exemplified in Fig. 1, an aluminum tubular conduit 20 is preformed as shown or in any desired manner so long as the convolutions lie in a single plane.

It is preferred to use the particular arrangement of convolutions disclosed so that the intermediate convolutions 15 will run from side to side of the portion of the sheet which is to comprise the bottom of the evaporator chamber and the end convolutions 16, 17 run from front to rear of the portions of the sheet which are to comprise the sides.

An aluminum welding flux which is now commercially available is applied by spraying, dipping or painting the bottom surface of the tubing as shown at 21, after which the conduit is placed upon the upper surface of an aluminum sheet 22.

To avoid the necessity for placing weld rod or solder along the whole length of the conduit 20, the sheet 22 preferably comprises laminated aluminum stock which is also commercially available and which has a fusible surface ply bonded to a base ply. In each such sheet a base ply 25, Fig. 6, comprises about 90% of the total thickness. The upper or top lamination 26 of the sheet as shown comprises a bonded layer of aluminum alloy (making up the remaining 10% of the total thickness of the sheet), having a somewhat lower point of fusion than the thicker base ply 25. This is accomplished commercially by alloying the top ply with silicon. About 5% of silicon will serve the purpose, but the exact formula used, as well as the method of bonding the sheets (done commercially by rolling them together), forms no part of this invention.

Figure 2:
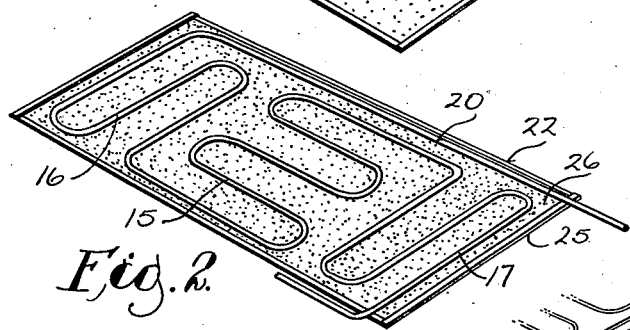
Fig. 2 is a view in perspective of the assembled stock unit.
Figure 4:
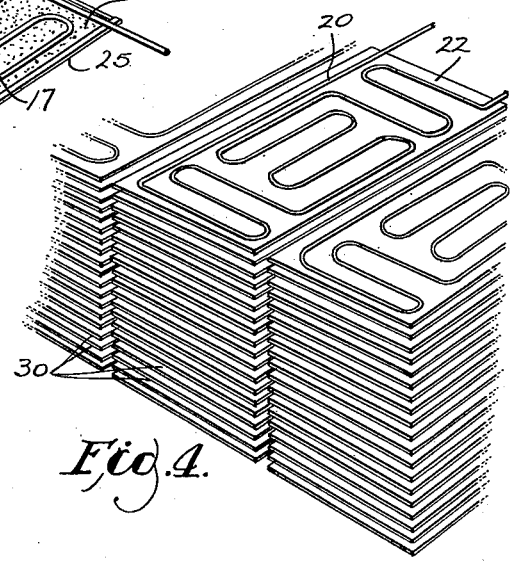
Fig. 4 is a perspective view of a plurailty of finished stock units stacked for storage.
Figures 3, 5:
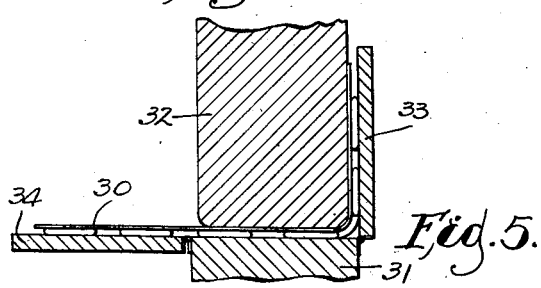
Fig. 3 is a front elevation of a plurality of units as shown in Fig. 2, stacked in superposed relation and disposed within a heating oven.
Fig. 5 is a front elevation of a bending table showing one of the units being bent to form a coil structure.

After the stock material is assembled as shown in Fig. 2, several such sheets are stacked in superposed relation and placed in a heating oven as shown in Fig. 3. Heat is then applied to the stock material until it reaches at least the point of fusion of the upper ply or lamination 26, but such heat is kept well below the point of fusion of the base ply 25. This results in the upper surface of each aluminum sheet becoming fused, with the result that the bottom surface of coiled conduit 20 is welded along its entire length to the upper surface of plate 22. After the units of stock material are removed from the furnace, they are cleaned and stored in stacks as shown in Fig. 4, preparatory to being assembled into refrigerator evaporators or like structures.

Figure 6:
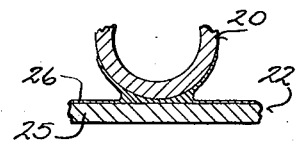
Figs. 6, 7 and 8 are fragmentary cross sectional views illustrative of the various manners in which tubing of various types may be joined to sheet metal stock by my improved method.
Figure 7:
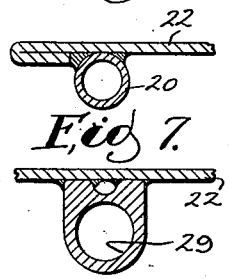
Figure 8:
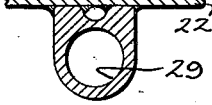

Various types of tubing may be welded to the sheet metal by this method as shown in Figs. 6, 7 and 8. Fig. 6 discloses fragmentarily a tubing of circular cross section. Fig. 7 discloses a tubing which has been welded in a position adjacent the margin of folded sheeting whereby the welding metallically joins the tubing both to the sheet and the infolded margin of the sheet. Fig. 8 shows in cross section an extruded tubing provided with a longitudinal channel 29 to provide additional welding surface between the tubing and the sheet as shown. In every case the surface tension draws the fused alloy to the crevice between the tube and the sheet, forming a fillet which gives mechanical strength and excellent heat conductivity between sheet and tube.

It will, of course, be understood that the metal of the tube will usually be substantially the same metal or alloy as is used in the sheet. Assuming that the sheet is aluminum in accordance with the preferred form of the invention as herein disclosed, the tubing used will also be aluminum and the fusible welding material and flux will be suitable for use in joining aluminum parts.

Assembly of refrigerator evaporators from the tube and sheet stock is an extremely simple operation, as shown in Fig. 5, wherein a sheet of stock 30 is placed upon a folding table 31 after which a form 32 is lowered to contact a central portion thereof and the hinged arms 33 and 34 are raised to bend side portions of the stock into a desired form as shown in Fig. 9.

Through the use of a somewhat longer sheet of prepared stock and extending the folding operation as described, an evaporator of the type shown in Fig. 10 may be easily assembled. A particularly economical method of manufacturing evaporators of the refrigerated shelf type is shown in Fig. 11. To construct such an evaporator, a preformed coiled tubing is welded to two separate sheets in the manner described heretofore, after which opposite margins of the sheet which ultimately forms the refrigerant shelf may be flanged as shown in Fig. 11. The sheet forming the housing is then bent in the manner described, after which the refrigerator shelf is brought into place from the position shown in dotted lines, Fig. 11, to the position shown in solid lines, by bending the connecting tubing.

The finished products show a high efficiency of thermal transfer between the contents of the tube and the air or other fluid exposed to the exterior surfaces of the device. While the preformed tube should conform as nearly as possible to the surface of the plate to which it is to be welded, any slight discrepancy in conformation is readily taken care of by the softening of the tube at the welding temperature and by the marked tendency of the fused alloy to flow into and completely to fill all crevices, thus not only producing a very strong job mechanically, but one in which the tube becomes so welded to the plate that there is a very efficient connection of high thermal conductivity therebetween. The plate becomes virtually an extension of the heat radiating or absorbing surfaces of the tube.

As indicated in the drawings, the tube may be so convoluted with reference to the folds or bends to be made in the plate that the tube may have any desired disposition with reference to the sides of the finished evaporator or other product. Figs. 9 and 10 show the tube extending horizontally or from front to rear along the sides, while Fig. 11 shows the tube extending vertically along the sides.

While it is convenient in the present device to preform the tubing into conformity with a flat plate, it will, of course, be understood that the tubing might be preformed to fit a surface of some other shape if desired. The flat form of plate is here preferred because it enables the parts to be stored in a minimum of space and to occupy a minimum of space in the oven while being treated. The oven treatment brings all portions of the apparatus up to the desired temperature at substantially the same time and thus assures properly welded joints throughout.

The fact that the fusible material is present only on the surfaces which are to be welded in the oven makes it possible to stack the assembled units in direct contact each with the other without any tendency for adhesion between units.

At the welding temperature the entire tube of each unit is so softened that under the weight of superposed units the respective tubes tend to flatten out into absolute conformity with their respective sheets.

As soon as the molten material is thoroughly set, the devices are removed from the oven and plunged for cleaning into hot water. Their original color may be restored with acid if desired. The operation herein disclosed not only produces a highly efficient evaporator, but saves more than half the cost of comparable evaporators heretofore known.

This is a companion to the application of Joseph G. Rayniak entitled Welded aluminum articles and method of manufacture thereof, now Patent No. 2,302,505, issued November 17, 1942. The compositions and temperatures used for the purpose of the present invention may be those disclosed in the said Rayniak application.

I claim:

1. A heat exchanger or evaporator comprising sides and a bottom in one continuous sheet, at least a partial top constituting an extension of such sheet from one of said sides, a shelf, means connecting said shelf with said top, said shelf and connecting means also being continuous extensions of said single sheet, and a single continuous tube fused to the side, bottom and shelf portions of said sheet and provided with convolutions on the aforesaid sheet portions.

2. A heat exchanger or evaporator comprising in one single continuous sheet a first side, a bottom, a second side, a partial top, a vertical partition, and a shelf extending parallel to said partial top from said vertical partition to said second side, and a single continuous tube disposed in convolutions on the face of said sheet about said first side, bottom, second side, top partition, and shelf, said tube being fused to said sheet throughout said convolutions, the sheet having rounded corner folds between the sides and the bottom thereof, and the said convolutions including runs generally paralleling said folds.

JOHN F. FURRY.